(No Model.)
P. MEDART.
BELT PULLEY.
No. 248,596. Patented Oct. 25, 1881.
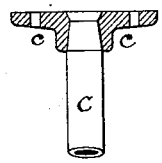
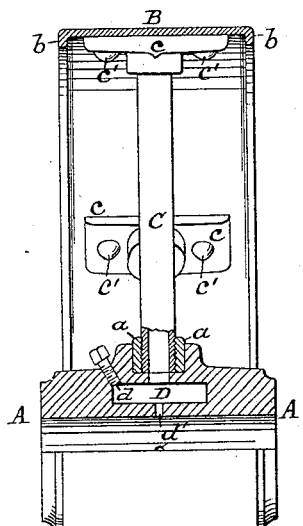
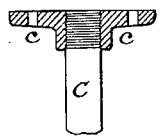
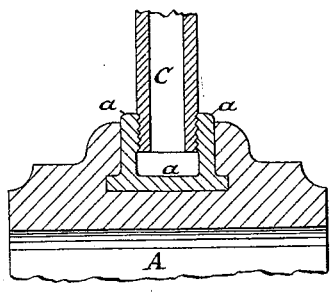
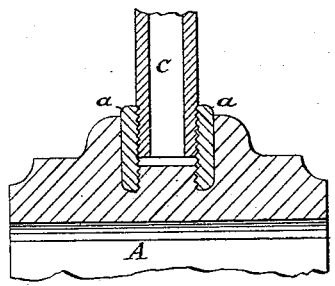
ATTEST:
Wm Medart
Robert Burns
INVENTOR:
Philip Medart

UNITED STATES PATENT OFFICE.

PHILIP MEDART, OF ST. LOUIS, MISSOURI, ASSIGNOR OF ONE-HALF TO WILLIAM MEDART, OF SAME PLACE.

BELT-PULLEY.

SPECIFICATION forming part of Letters Patent No. 248,596, dated October 25, 1881.

Application filed April 19, 1880. (No model.)

To all whom it may concern:

Be it known that I, PHILIP MEDART, of the city and county of St. Louis and State of Missouri, have invented certain new and useful Improvements in Belt-Pulleys, of which the following is a specification.

My invention relates to that class of pulleys having a rim of wrought metal formed separately from the spokes or center, as shown in my reissued Letters Patent No. 9,671, dated April 19, 1881; and it consists in certain improvements hereinafter specified.

In the accompanying drawings, Figure 1 is a view, partly in section, of one of my improved pulleys. Figs. 2 and 3 are detail sectional views, showing spoke-sockets inserted in the hub; and Figs. 4 and 5 are detail views, showing different ways of securing the bracket-lugs upon the ends of the spokes.

A represents the hub, B the rim, and C the arms of the pulley.

The hub A is formed of cast metal, and the screw-threaded sockets $a$ are secured or incorporated therein in the operation of casting. These sockets may be of wrought or cast metal, and of any suitable shape to be retained firmly in the hub.

Figs. 2 and 3 show sockets of different shapes.

I also form an annular oil-chamber, D, in the hub, which communicates with the bearing of the pulley by small radial openings $d'$, and also with the spoke-socket opening, as shown in Fig. 1. This chamber is closed by a suitable screw-plug $d$.

The arms C are preferably formed of gas-tube or wrought-metal tubing, the openings in which communicate with the oil chamber or reservoir D when the spokes are screwed into their sockets in the hub, and form an additional reservoir for the oil. When the pulley is used as a loose pulley or "idler" its bearing will be kept properly and constantly oiled. It is not necessary, however, that the arms of the pulley should be hollow.

The bracket-lugs $c$, to which the pulley-rim is attached, are formed of cast or wrought metal, and are either screwed thereon, as shown in Fig. 5, or riveted, as shown in Fig. 6.

In order to give strength and rigidity to the pulley, I form the wrought-metal rim B with an inturned flange, $b$, at each edge.

The corner formed by the inturned flange $b$ and the face of the rim can be slightly rounded, which will prevent the belt from being cut and greatly facilitate its shipping and unshipping.

The rim B, which may be formed of one or several pieces, is secured to the bracket-lugs by bolts or rivets $c'$ $c'$.

By making the hub, spokes, bracket-lugs, and rim separately and uniting them as described, pulleys of varying sizes can be produced with great facility. The necessity of having a pattern for each size of pulley is avoided, and a single pattern for the hub will answer for all sizes of pulleys, for the reason that the arms can be varied in length to suit the diameter of the pulley required.

Having thus described my invention, what I claim is—

1. A belt-pulley having a wrought-metal rim with inturned flanges, for the purpose set forth.

2. A belt-pulley having a wrought-metal rim and an inturned flange at each edge, the corners or angles formed by the face of the rim and the inturned flanges being rounded, substantially as and for the purpose set forth.

3. The cast belt-pulley hub herein described, having the socket-pieces for the pulley-arms incorporated therein in the operation of casting, as set forth.

4. The combination, substantially as herein set forth, of the cast-metal hub, the independent socket-pieces incorporated or secured therein, the pulley-arms, and the rim.

PHILIP MEDART.

Witnesses:
WM. MEDART,
ROBERT BURNS.